United States Patent [19]

Tisma

[11] Patent Number: 4,738,081
[45] Date of Patent: Apr. 19, 1988

[54] AUTOMATIC PACKAGING MACHINES WITH WEAR RESISTANT PARTS

[75] Inventor: Steven Tisma, Chicago, Ill.

[73] Assignee: Tisma Machine Corporation, Chicago, Ill.

[21] Appl. No.: 905,696

[22] Filed: Sep. 9, 1986

[51] Int. Cl.$^4$ .................. B65B 1/22; F16C 17/00
[52] U.S. Cl. ................................ 53/525; 384/42
[58] Field of Search .................. 53/525; 198/841; 384/42

[56] References Cited

U.S. PATENT DOCUMENTS

| | | | |
|---|---|---|---|
| 3,054,645 | 9/1962 | Evans | 384/42 |
| 3,105,723 | 10/1963 | Hamaker, Jr. | 384/42 |
| 3,233,949 | 2/1966 | Rieman et al. | 384/42 |
| 3,885,837 | 5/1975 | Mellor | 384/42 |
| 4,566,738 | 1/1986 | Fasth | 384/42 X |
| 4,578,929 | 4/1986 | Tisma | 53/525 |

Primary Examiner—Horace M. Culver
Attorney, Agent, or Firm—Laff, Whitesel, Conte & Saret

[57] ABSTRACT

An automatic packaging machine transports an object over a path having a freedom for both horizontal and vertical movement. Horizontal rails support a pair of guide blocks positioned to slide over the rails. Each of the guide blocks has a pair of spaced parallel slots with a T-shaped cross-section confronting individually associated one of the rails. A replaceable wear resistant track is slidably captured within each of the T-shaped slots, to slide over an individually associated one of the rails. A vertical support bar interconnects the second guide blocks. An upper and a lower U-shaped block is attached to the vertical support bar at vertically spaced locations. A keeper is secured over the open space of each of the U-shaped blocks. A block of wear resistant material is positioned in a recess in each of four interior surfaces of the U-shaped block and keeper, a slidable vertical bar being captured and sliding within the embrace of the U-shaped blocks. There is enough play within the sleeve member for the slidable vertical bar to swing out of a sleeve member having a keeper removed while the other keeper remains in place, to enable the wear blocks to be replaced. The slidable vertical bar carrys the object over the path.

16 Claims, 2 Drawing Sheets

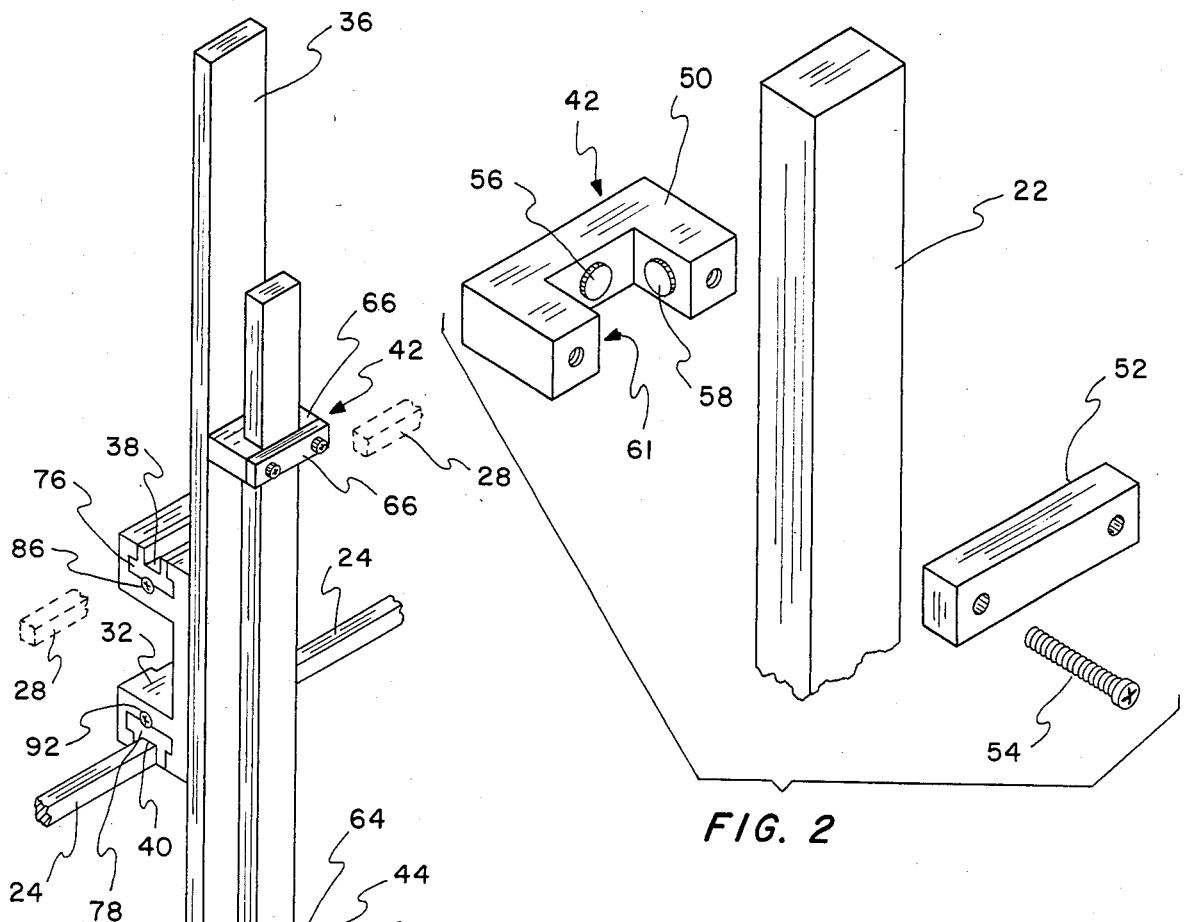
FIG. 2
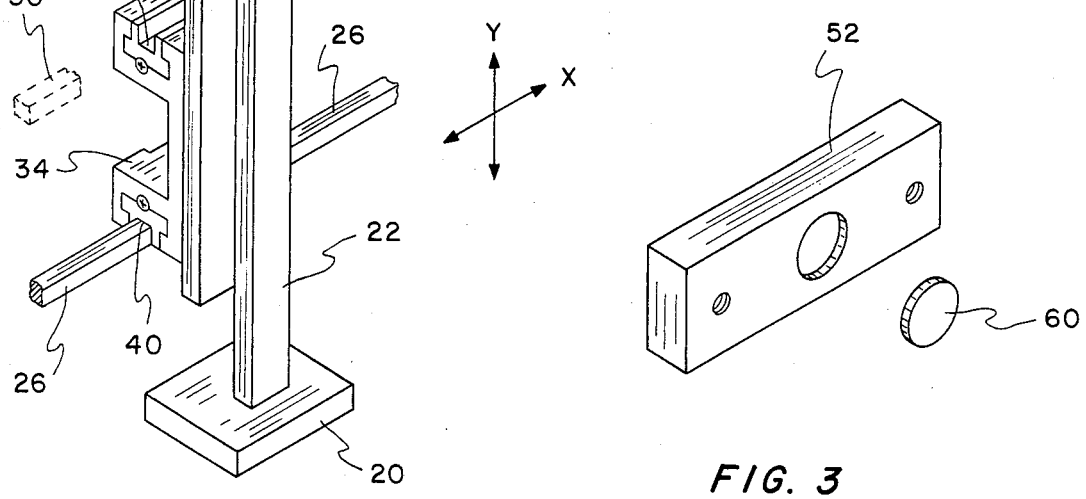
FIG. 1
FIG. 3

AUTOMATIC PACKAGING MACHINES WITH WEAR RESISTANT PARTS

This invention relates to automatic packaging machines and more particularly to providing wear resistant parts for such machines.

One known example of an automatic packaging machine is found in U.S. Pat. No. 4,578,929. Heretofore, this type of machine has been maintained by a crew of men who would repair or replace parts, change or adapt machines to set up a new production run, or the like. With the advent of microprocessors and microcomputers these packaging machines are being equipped to operate as unattended robots. As the machines become more self-sufficient, the number of repair men and operators is sharply reduced. The skill level of those who remain is greatly increased to become computer operators. Then, the cost of repair and replacement becomes more expensive because there are fewer people to make the repairs and those who do remain command higher salaries and wages while knowing less about mechanical aspects of the machine. Therefore, it is desirable either to elimininate those parts which require frequent maintenance or to make it very easy to replace such parts.

For example, automatic packaging machines may include a plurality of rails, along which mechanical parts may slide. The rails may be both horizontal or vertical. Either way, the member which slides on the rail is likely to wear out rather quickly.

Accordingly, an object of the invention is to provide new and improved packaging machines. In particular, an object is to provide wear resistant parts at locations where a part slides along a rail. Still another object is to provide wear resistant parts which may be replaced quickly and easily by persons having little or no special training.

In keeping with an aspect of the invention, these and other objects are accomplished by providing wear resistant, preferably plastic bushings at points where wear is most likely to occur. The bushings may be replaced quickly and easily by simply removing one or two screws, and without any further disassembly. Then, the screws are replaced and the replacement is complete.

A preferred embodiment of the invention is shown on the attached drawing, wherein:

FIG. 1 shows vertical and horizontal rails having wear resistant means for mounting a moving part, in keeping with the principles of the invention;

FIG. 2 is an exploded view of the vertical rail and wear resistant bushings associated therewith;

FIG. 3 is part of the exploded view of FIG. 1, which shows the reverse side of a keeper element seen in FIG. 2;

Figures 4, 5:
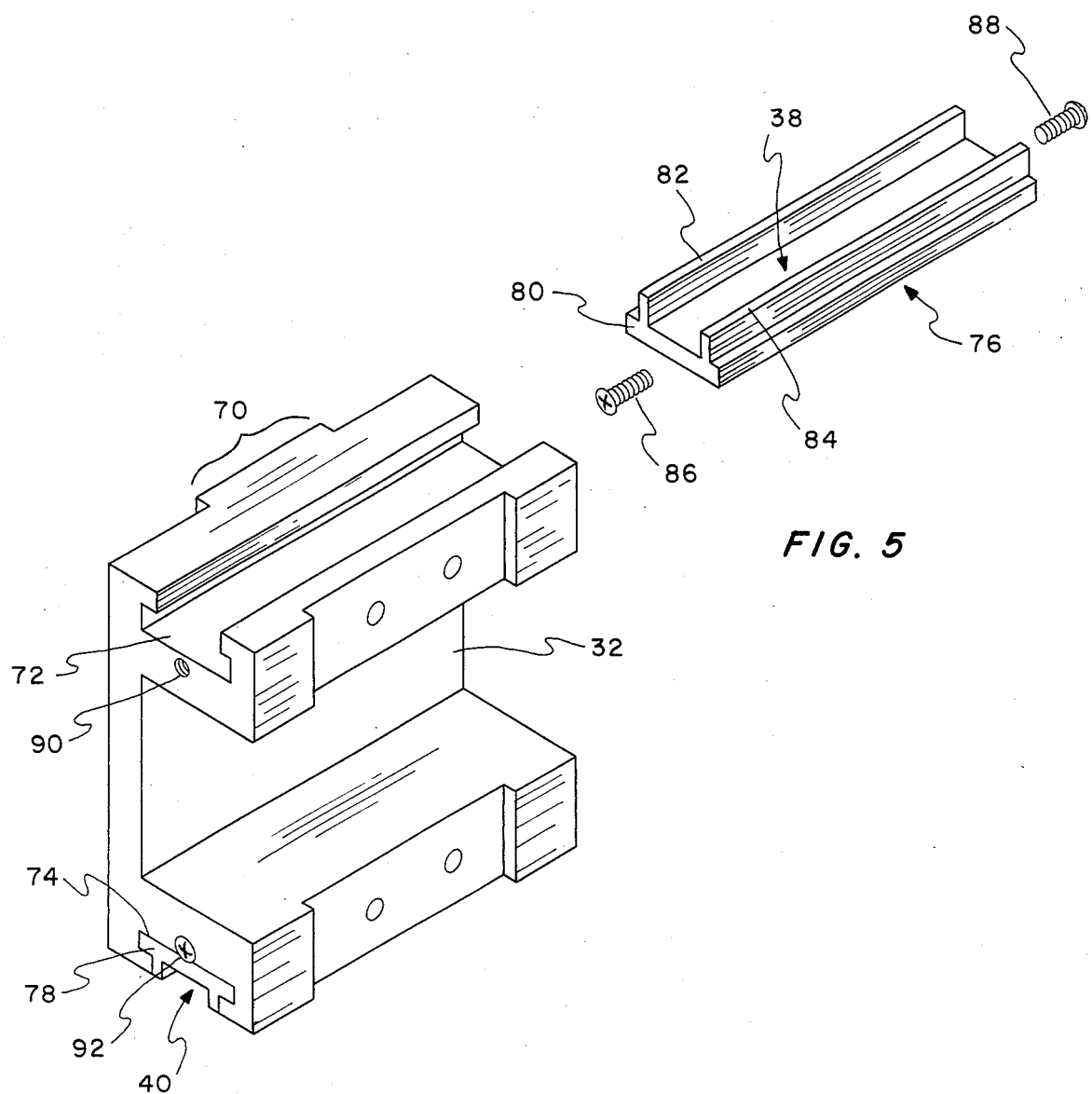
FIG. 4 is a perspective view which shows a guide block member that slides along horizontal rails.
FIG. 5 is a perspective view of a plastic wear resistant track used in the guide block member of FIG. 4.

FIG. 1 includes a part 20 which may be moved vertically by the movement of a rail or support member 22 or horizontally by sliding along rails 24–30. Each of two upper rails 28, 30 is shown by dotted lines, so that the wear resistant track may be seen. The purpose of part 20 is irrelevant. For example, this could be the assembly 102 in FIG. 9 of U.S. Pat. No. 4,578,929, or the like. Therefore, it will hereinafter be generically referred to as a "tool".

A pair of guide blocks 32, 34 are mounted on and affixed at spaced locations along a vertical support bar 36. Each guide block has upper and lower tracks 38, 40 which slide along the rails 24–30, as the assembly moves horizontally.

On the opposite side of the support bar are upper and lower sleeve or support members 42, 44 through which the tool support member 22 may slide. Thus, the tool 20 may move along an X-axis, as guide blocks 32, 34 slide along the rails 24–30 and along the Y-axis when the rail or tool support member slides 22 within the sleeve or support members 42, 44.

It should be apparent that much of the wear caused by this X-Y motion occurs at the rails 24–30 and at the interior of the sleeve or support members 42, 44. Heretofore a substantial amount of disassembly was required to remove the supported equipment and to replace these parts, when they wear out.

In keeping with the invention, the sleeve members 42, 44 are constructed, as shown in FIGS. 2, 3. Each sleeve member comprises a generally U-shaped block 50 which surrounds and embraces rail or the sliding tool support member 22. A keeper 52 is bolted across the open ends of the U-shaped block 50 to capture and hold rail or the sliding tool support member 22, one of the bolts being shown at 54. Inside the U-shaped support member 42, on each of the three interior walls thereof and on the inside of keeper 52 (FIG. 3), are wear resistant blocks 56–60 made of any suitable wear resistant material. (On the inside of block 50, at 61, there is another wear resistant block which can not be seen in FIG. 2.) As should be clear from FIG. 3, the metal forming the keeper 52 is also shaped to form recesses for receiving a block 60 of the wear resistant material. Since the presence of the vertical rail or tool support member 22 provides a fairly tight fit which holds blocks 56–60 in place, it is not necessary to provide any bonding. Thus, the blocks may be easily picked out and replaced when the vertical rail or tool support member 22 is moved out of the way.

In FIG. 1, the lower keeper 62 may be removed and the rail or vertical tool support member 22 may swing somewhat as a pendulum, about an axis established by the upper sleeve a support member or 42 in order to clear and to be out of the embrace of the U-shaped member 64, without loss of the capture by the upper sleeve member. The old worn out wear resistant blocks 56–60 may be removed and replaced by new blocks while rail or member 22 is out of the embrace of the lower support or sleeve member 44. Then, the lower keeper 62 may again be bolted into place.

Next, the upper keeper 66 is removed and the rail or tool support member 22 is swung away from the upper U-shaped block 66. The worn out wear resistant blocks 56–60 are removed and replaced at support or sleeve member 42. Then, the tool support member 22 is returned to the capture position and keeper 66 is again bolted into position. The rail or vertical tool support member 22 may now slide up and down in the support or sleeve members 42, 44, riding on the new wear resistant blocks 56–60.

FIGS. 4, 5 show the wear resistant tracks which ride on the horizontal rails 24–30. In greater detail, the guide block 32 is a part which is made of metal. For example, it may be machined from hard aluminum. The back of guide block 32 has a projecting vertical key 70 which fits into a suitable recess in the support bar 36 (FIG. 1); therefore, when bolted to the support bar 36, the guide blocks and support bar form a rigid, interlocking structure.

The upper and lower surfaces of the guide block 32 contain "T" shaped slots 72, 74. These T-slots slidingly receive hard nylon track sections 76, 78, each of which is in the form of a base plate 80 (FIG. 5) having two upstanding flanges 82, 84 defining between them the track 38 (40, for the lower track) which slides over one of the rails 24–30. The dimensions are such that the track section 76 slides into and is held by the T-slot 72. Track section 40 is shown already in the place within the T-slot 74. The screws 86, 88 fit into the threaded hole 90 and another hole (not seen) on the far side of the guide block 32 to hold the hard nylon track 76 in place within the T-slot 76. The screw 92 is shown holding the nylon track section 78 in place in T-slot 74.

To replace nylon track sections in the upper guide block 32, the screws 86-92 are removed. New track sections 76, 78 are placed over rails 28,24 (FIG. 1). and the guide block 32 is then moved toward the new track sections. As these track sections enter into the T-slots 72, 74, they push the worn tracks sections out of the slots. After the new tracks section 76, 78 are properly positioned, the screws 86, 88, 92 (and a fourth screw not seen in FIG. 4) are returned to the threaded holes to capture the nylon track sections.

If the guide block 32, 34 are attached to parts of the machine and can not be manually moved over the rails 24–30, the machine may be either programmed to move at an appropriate speed and over a distance equal to the length of the new track section; or, it may be moved responsive to repeated movement of an "inching" control which causes the machine to take small incremental movements.

Those who are skilled in the art will readily perceive how to modify the system. Therefore, the appended claims are to be construed to cover all equivalent structures which fall within the true scope and spirit of the invention.

The claimed Invention is:

1. A wear resistant machine for moving a tool over coordinate axes, said machine comprising at least one horizontal rail and vertical bar, support means for movably supporting said rail and said bar for providing motion along each of said axes, wear resistant means interposed between said support means and said rail and said bar, means associated with said rail and said bar for moving said tool along each of said axes, and means for replacing said wear resistant means without requiring a substantial disassembly of said tool support means.

2. The wear resistant machine of claim 1 wherein said support means comprises at least one guide block containing a track section for sliding over said horizontal rail, said track section being made of a plastic which is resistant to wear, and means for replacing a worn track section by placing a new track section over a rail and moving said guide block over said new track section, the new track section pushing a worn track section out of said guide block.

3. The wear resistant machine of claim 1 wherein said guide block has upper and lower track sections and wherein there are at least two horizontal spaced parallel rails on which said tracks sections ride.

4. The wear resistant machine of claim 1 wherein there are two of said guide blocks, each of said guide blocks having upper and lower track sections, and wherein there are four spaced parallel horzontal rails on which said track sections ride, and a vertical support bar attached to and spanning a distance between said guide blocks, whereby said two guide blocks and vertical support bar are rigid structure.

5. The wear resistant machine of claim 4 wherein said vertical support bar has upper and lower sleeve members, and a tool support member including a sliding vertical bar mounted to slide through said sleeve members.

6. The wear resistant machine of claim 5, wherein each of said sleeve members comprise a generally U-shaped block having a keeper attached across the open end of the U-shape, said sliding vertical bar being held in the embrace of said U-shaped block by said keeper.

7. The wear resistant machine of claim 6 wherein each of said sleeve members include four wear resistant block members, said sliding vertical bar moving out of the embrace of one of said U-shaped block when said keeper is removed therefrom and while the keeper of the other block is not removed therefrom, whereby said other block with the keeper in place prevents said tool support member from being disassembled while said wear resistant block members are being replaced in said one block.

8. The wear resistant machine of claim 7 wherein each interior side of said U-shaped block and said keeper includes a recess shaped to receive a block of wear resistant material, said wear resistant material being held in said recess by a capture of said sliding vertical bar within said U-shaped block.

9. An automatic packaging machine comprising at least one horizontal rail for guiding a tool along a path through said machine, at least one guide block riding on said rail and carrying said tool, a replaceable wear resistant track interposed between said guide block and said rail, a vertical support bar mounted on said guide block, upper and lower sleeve members mounted on said vertical support bar, a slidable vertical bar mounted in said sleeve members, replaceable blocks of wear resistant material positioned inside said sleeve members on which said slidable vertical bar slides, and means for carrying said tool on said slidable vertical bar.

10. The machine of claim 9 wherein said guide block has at least one slot with a T-shaped cross-section, said T-shaped slot slidably receiving and capturing said replaceable wear resistant track, whereby a worn out one of said tracks may be removed and replaced by sliding a new track into said T-shaped slot.

11. The machine of claim 10 wherein there are a plurality of said rails and a plurality of said T-shaped slots with replaceable wear resistant tracks adjacent each rail for giving vertical stability to said tool support, and means for capturing or releasing said wear resistant track in each of said T-shaped slots, whereby a new one of said wear resistant tracks may be placed on said rail and said guide block may be pulled over said new wear resistant track to dislodge a worn track and install a new track.

12. The machine of claim 9 and replaceable blocks of wear resistant material inside each of said sleeve members for supporting said slidable vertical bar, and means for replacing said blocks of wear resistant material in either one of said sleeve members while said slidable vertical bar remains captured in the other of said sleeve members.

13. The machine of claim 12 wherein said guide block has at least one slot with a T-shaped cross-section, said T-shape slot slidably receiving and capturing said replaceable wear resistant track, whereby said track may be removed and replaced by sliding a new track into said T-shaped slot and pushing a worn out track out of said slot.

14. The machine of claim 13 wherein there are a plurality of said rails and a plurality of said T-shaped slots for giving vertical stability to said slidable vertical bar, and means for capturing or releasing said wear resistant track in each of said T-shaped slots.

15. The machine of claim 14 wherein each of said sleeve members comprises a U-shaped block having a recessed area on the three inside surfaces forming said U-shape, a keeper secured over the open side of said U-shape, a recessed area on the inside surface of said keeper, one of said blocks of wear resistant material fitting into each of said recesses.

16. A system for transporting an object over a path with a freedom for both horizontal and vertical movement, said system comprising four vertically aligned horizontal rails, a first guide block positioned between an upper two of said rails, a second guide block positioned between a lower two of said rails, each of said guide blocks having a pair of spaced parallel slots with a T-shaped cross-section confronting individually associated ones of said rails, a replaceable wear resistant track slidably captured within each of said T-shaped slots, said captured track being positioned to slide over an individually associated one of said rails, a vertical support bar interconnecting said first and second guide blocks, an upper and lower U-shaped block attached to said vertical support bar at two locations which are vertically spaced along said vertical support bar, a keeper secured over the open space of each of said U-shaped blocks, a block of wear resistant material positioned in a recess in each of four interior surfaces of said U-shaped block and keeper, and a slidable vertical bar captured and sliding within the embrace of the U-shaped blocks forming said sleeve members, said slidable vertical bar sliding against said blocks of wear resistant material, there being enough play within said sleeve member for said slidable vertical bar to swing out of a sleeve member having a keeper removed while the other keeper remains in place, said slidable vertical bar swinging far enough out of said embrace of said U-shaped blocks to enable said wear blocks to be replaced, said slidable vertical bar carrying said object over said path.

* * * * *